(12) United States Patent
Gates

(10) Patent No.: US 9,035,479 B1
(45) Date of Patent: May 19, 2015

(54) TURBINE CONTROLLER FOR OPTIMIZING ECONOMIC PRESENT VALUE OF THE TURBINE

(71) Applicant: Robert Gates, Montecito, CA (US)

(72) Inventor: Robert Gates, Montecito, CA (US)

(73) Assignee: WIND STREAM PROPERTIES, LLC, Santa Rosa, CA (US)

( * ) Notice: Subject to any disclaimer, the term of this patent is extended or adjusted under 35 U.S.C. 154(b) by 0 days.

(21) Appl. No.: 14/329,712

(22) Filed: Jul. 11, 2014

(51) Int. Cl.
| | |
|---|---|
| *F03B 13/00* | (2006.01) |
| *F03B 13/10* | (2006.01) |
| *H02P 9/04* | (2006.01) |
| *F03D 9/00* | (2006.01) |
| *G06Q 10/06* | (2012.01) |
| *G06Q 50/06* | (2012.01) |
| *F03D 7/00* | (2006.01) |

(52) U.S. Cl.
CPC .......... *G06Q 10/06313* (2013.01); *G06Q 50/06* (2013.01); *F03D 7/00* (2013.01); *F03D 9/003* (2013.01); *F03D 9/005* (2013.01)

(58) Field of Classification Search
CPC ................................. F03D 9/003; F03D 9/005
USPC ............................. 290/43, 44; 705/7.11–7.42
See application file for complete search history.

(56) References Cited

U.S. PATENT DOCUMENTS

| | | | |
|---|---|---|---|
| 6,850,821 B2 | 2/2005 | Weitkamp | |
| 6,925,385 B2 | 8/2005 | Ghosh et al. | |
| 8,892,264 B2* | 11/2014 | Steven et al. | 700/286 |
| 2004/0102872 A1 | 5/2004 | Schick et al. | |
| 2006/0276938 A1* | 12/2006 | Miller | 700/295 |
| 2009/0313083 A1* | 12/2009 | Dillon et al. | 705/10 |
| 2012/0049516 A1* | 3/2012 | Viassolo | 290/44 |
| 2012/0095841 A1* | 4/2012 | Luckerman et al. | 705/14.66 |
| 2013/0035798 A1 | 2/2013 | Zhou et al. | |
| 2013/0214534 A1* | 8/2013 | Nakamura et al. | 290/44 |
| 2013/0320674 A1* | 12/2013 | Ingram | 290/43 |
| 2013/0332220 A1* | 12/2013 | Nielsen | 705/7.21 |
| 2014/0039965 A1* | 2/2014 | Steven et al. | 705/7.25 |
| 2014/0324495 A1* | 10/2014 | Zhou et al. | 705/7.13 |

FOREIGN PATENT DOCUMENTS

| | | |
|---|---|---|
| WO | WO 2012/025120 A1 | 8/2011 |
| WO | WO 2012/041326 A3 | 9/2011 |
| WO | WO 2012/041327 A3 | 9/2011 |
| WO | WO 2013/000474 A3 | 6/2012 |
| WO | WO 2013/044925 A1 | 4/2013 |

* cited by examiner

*Primary Examiner* — Sujay Koneru
(74) *Attorney, Agent, or Firm* — Cislo & Thomas, LLP

(57) ABSTRACT

A controller for optimizing the operation of a turbine to maximize the net present value of the revenue it generates over its lifetime. The controller calculates a plurality of net present values for a plurality of turbine output levels given certain input parameters such as power sale rate, power output level vs. fatigue damage accumulation, etc.; determines a maximum net present value from the plurality of output levels evaluated; and operates the turbine at the output level associated with the maximum net present value.

13 Claims, 8 Drawing Sheets

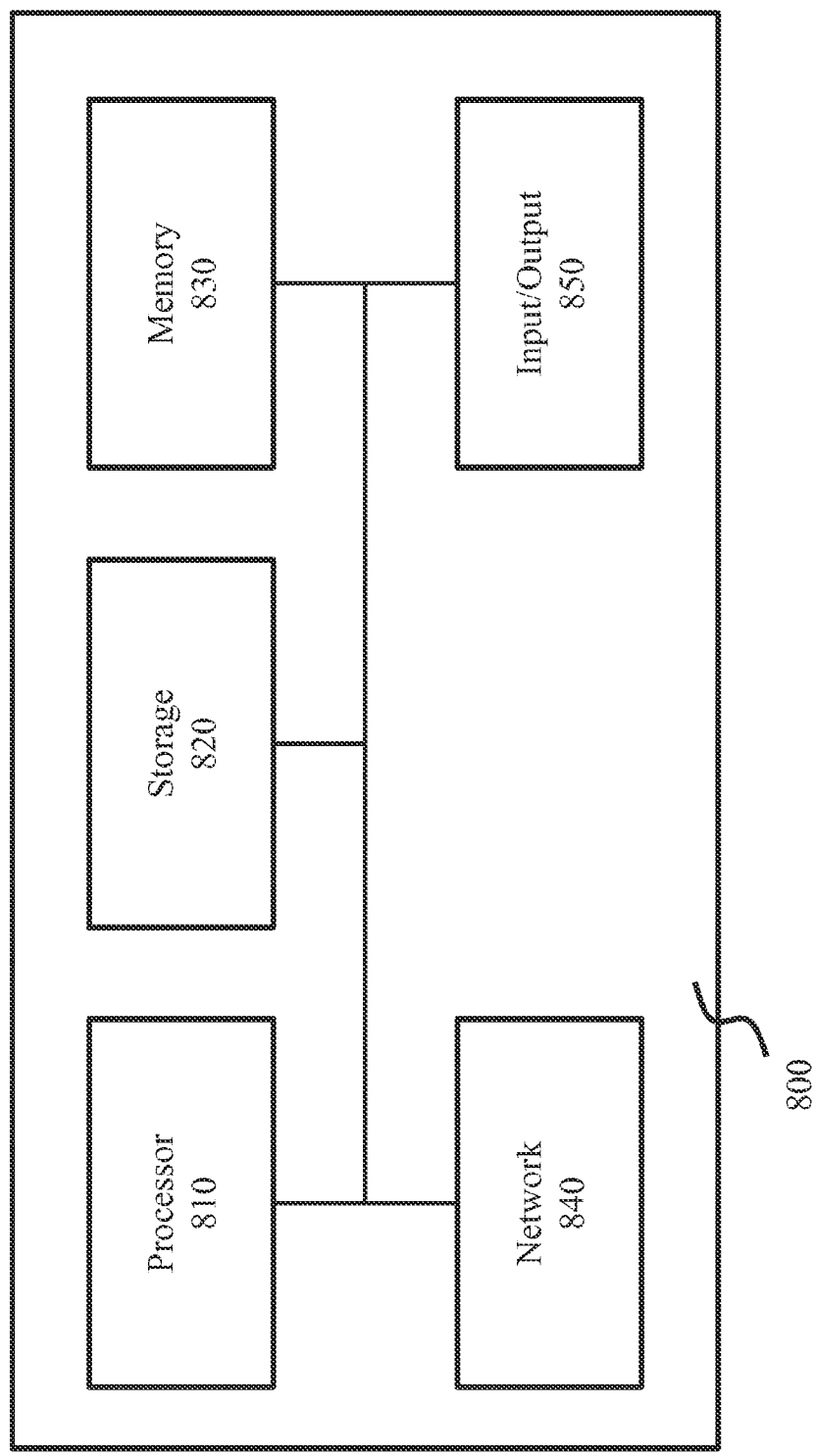

TURBINE CONTROLLER FOR OPTIMIZING ECONOMIC PRESENT VALUE OF THE TURBINE

TECHNICAL FIELD

This invention relates to a controller for maximizing the total net present value produced by a turbine.

BACKGROUND

Power generating equipment and facilities are a financial investment with the return on that investment coming over time. Optimizing the present value of the equipment investment is a key equipment management goal and priority. Machine operating strategies based on finding and optimizing the operation method to maximize the total net present value ("NPV") of the investment would produce the best financial results achievable. Strategies based on the values and criteria of the generator's owner, taking into consideration technical aspects of the fatigue endurance of the turbine; the present and future value of the energy produced; and the time value and uncertainty factor, and the discount rate for the owner can be used to determine the best operational strategy for maximizing the NPV of the investment in the equipment.

Turbines are currently used to take advantage of natural and renewable resources, such as wind and water. The turbines can be operated at high output levels for a shorter time or at lower output levels for a longer period of time until the machine's cumulative fatigue life is consumed, but the total life cycle output limited by cumulative fatigue will be about the same. Operating the machine(s) as a financial investment with the goal of maximizing the present value of the operation will optimize the financial result of the investment in the equipment.

SUMMARY

The present invention is directed towards maximizing the NPV of the investment in the machine(s) by iteratively calculating the NPV based on greater and lesser output levels taking into account the fatigue versus power or load level on the equipment, the current and future values of the power sale, and the owner's discount factor, finding the combination of output level and lifetime which provides the greatest NPV, then commanding the machine's control system to operate at the level calculated to provide the optimized NPV. If and when any of the inputs to the calculations changes the process would be repeated.

The process involves controlling fatigue life limited power generating machinery, such as turbines, to maximize the NPV of revenue generated over their lifetime. This is achieved by calculating the optimal machine output level at any given time that will optimize the revenue generation of the turbine vs. fatigue life consumption, taking into consideration several factors such as power sale rates, wind speed distribution, power curve, etc. over the projected life of the turbine. The optimal power output level calculated for a given period is then communicated to the machine's control system to operate the machine at that level, and this is done at frequent intervals as required throughout the turbine's lifetime to achieve maximum NPV.

The process involves input value parameters based on manufacturing specifications, such as the machine's load versus fatigue life and the like; and market values, such as the current and future value of energy, the owner's discount rate, and the like.

The maximum lifetime NPV is determined by a series of calculations of the NPV of the operation at various output levels the normal design maximum, at the current and future energy values, for the duration of the fatigue life determined for each of the varying output levels. The maximum output level associated with the greatest NPV is the level which the machine will be commanded to operate at via its control system. The NPV can be re-calculated when any of the input, values or parameters change so as to assure that the current operational output level still produces the maximum NPV.

The NPV at each operating limit is calculated by summing the present values of each of the future year's revenue discounted at the discount rate. The relationship between the NPV of greater output in the near term to the NPV of lesser output for a longer time and the selection of the maximum value is the root of the process of selecting the optimum output level to maximize life cycle NPV.

A calculation to determine the maximum NPV for the life of the machine would be done initially and then recalculated if and when an input parameter changed, for instance, if the future or current power sale rate changed, if the owner's discount changed, etc.

The process of determining the maximum output level which would produce the maximum life NPV may be as follows: determine the input values, such as machine specifications, current power sale rate, future power sale rate, discount rate; determine the output level versus fatigue life; determine the machine's existing life used; determine the net capacity factor versus energy production; calculate the NPV of each of the output levels; select the maximum NPV and its associated output level; and command the machine via its control system to operate with the selected output value. If and when any of the input assumptions change, such as the power sale rate, re-determine the input values, re-calculate the NPV values, select the maximum NPV, and command the machine to operate at that value.

BRIEF DESCRIPTION OF DRAWINGS

FIG. 8 is a high level block diagram of an embodiment of a computer architecture to implement the present invention.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments, it is to be understood, however, that the same or equivalent functions and sequences may be accomplished by different embodiments that are also intended to be encompassed within the spirit and scope of the invention.

Figure 1:
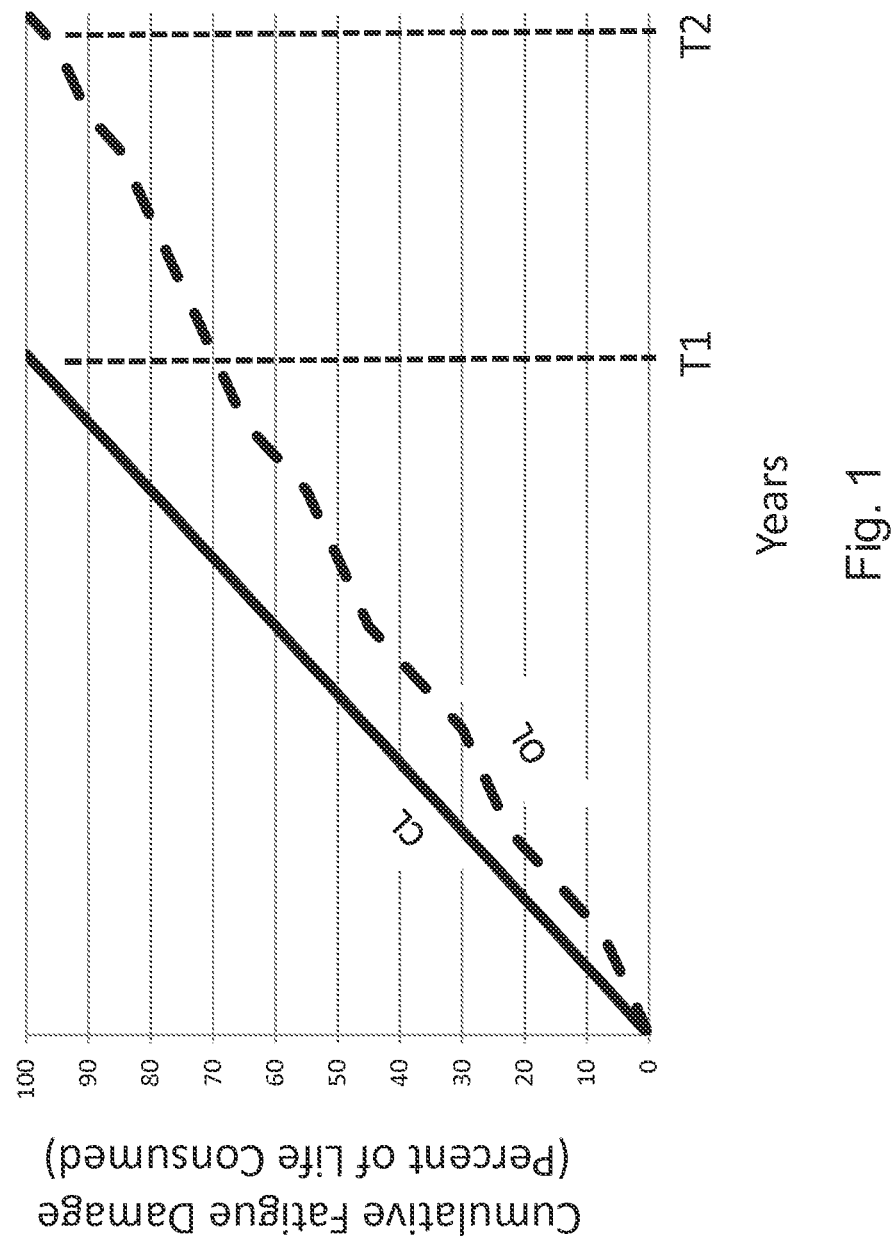
FIG. 1 shows a graph of the cumulative fatigue damage over time between a turbine run at conventional levels (CL) versus a lower output level (OL).

Turbines generally run for a predetermined fixed lifetime at a specified maximum output. Operators generally allow the turbines to run normally until wear and tear, that is fatigue damage, accumulates to a point that the turbine is non-operational. Therefore, the lifetime of a turbine is determined by its cumulative fatigue damage. The cumulative fatigue damage is a function of how long the turbine runs at a particular output level as shown in FIG. 1. A turbine running at a conventional level (CL) has a fixed lifetime T1. When that turbine is run at a lower output level (OL) its lifetime T2 is prolonged. However, running the turbine at a lower output level also generates lower amounts of power, and therefore lower revenue, and running the turbine at a higher output level generates more power and higher revenue. Therefore, it appears that the shorter lifetime caused by running a turbine at a higher output level is offset by the higher amounts of power generated. This, however, is not necessarily a directly proportional relationship.

Figure 2:
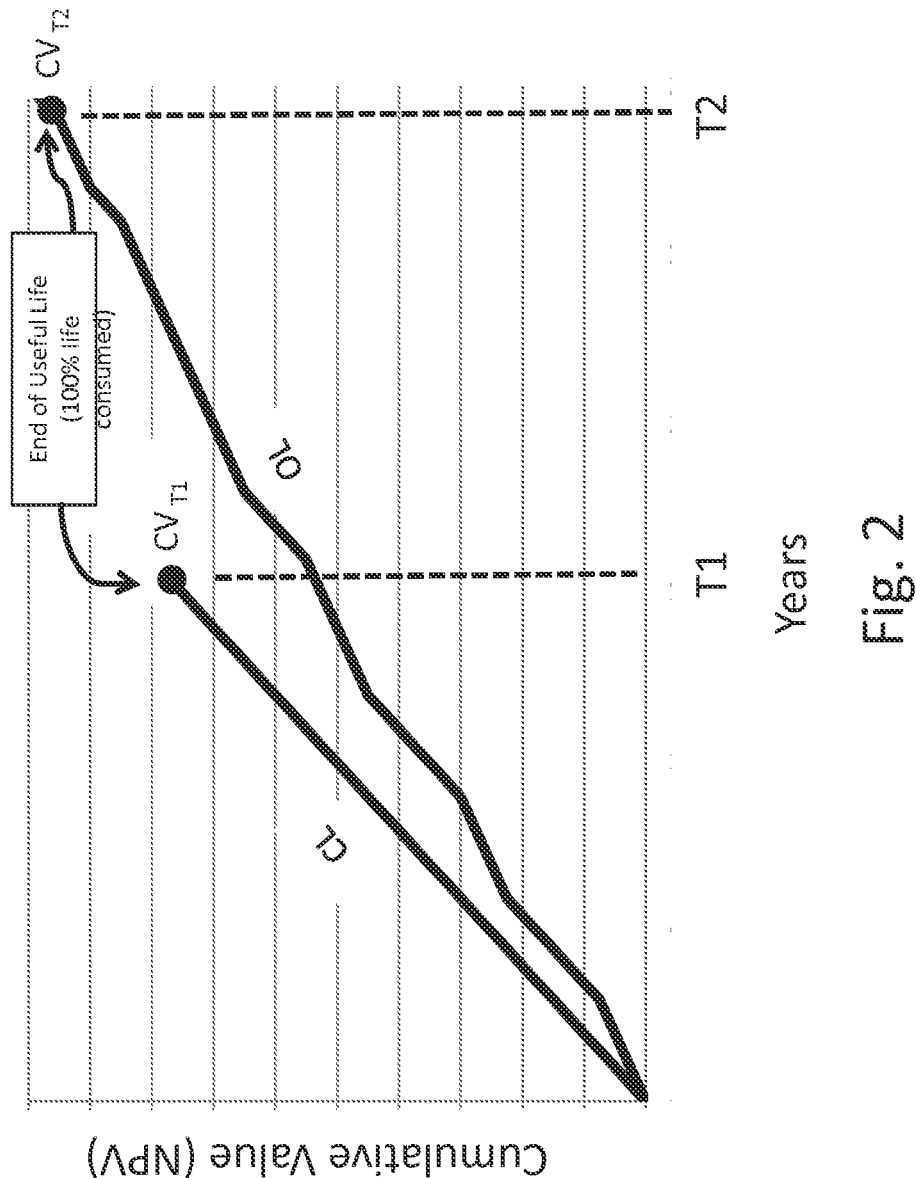
FIG. 2 shows a graph of cumulative net present value over a lifetime of a turbine run at conventional levels (CL) versus a lower output level (OL).

It is an objective of this invention to maximize total economic value generated by a turbine by utilizing a unique algorithm that carefully balances the amount of power/revenue generated with fatigue damage accumulation over the lifetime of the turbine by automatically varying the output level of the turbine based on calculation input values associated with fatigue life, power sale value and discount rate. Therefore, by using a controller to operate the turbine at an optimal level the cumulative total value ($CV_{T2}$) at the optimal output level (OL) would be greater than the cumulative total value ($CV_{T1}$) running at a conventional level (CL), as shown in FIG. 2. The key is determining what that optimum output level is for a given circumstance. The given circumstance may take into consideration present and future values of the power sale revenue and the fatigue life versus power output.

Although the description of the invention refer to turbines, the present invention can be applied to any machine in which its output levels can be controlled and has an determinable lifetime based on operation at any given output level.

Figure 3:
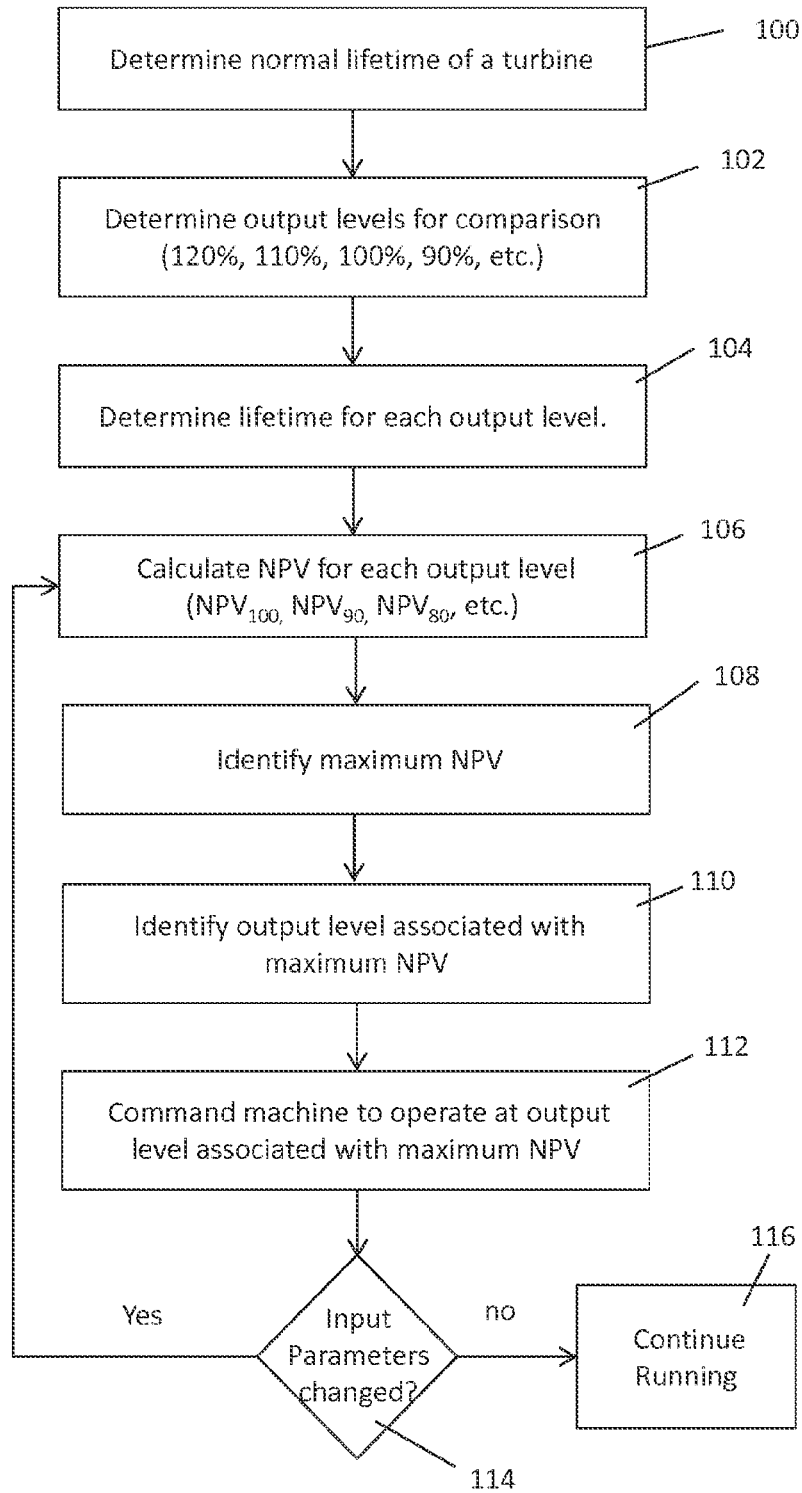
FIG. 3 shows a flow diagram of an embodiment of the present invention.

As shown in FIG. 3, a method of operating a turbine to maximize the economic value of the turbine over its lifetime comprises determining a normal lifetime of turbine 100, determining different output levels of operation for comparison 102, determining the remaining lifetimes of the turbine for each output level 104, and calculating a plurality of net present values of the turbine for a plurality of output levels 106 for the calculated life remaining. These steps can be performed by a controller configured accordingly. Once the NPV for each output level is determined, a comparison of the NPV values is made for each output level to determine the highest value 108, which is the maximum NPV. Once the maximum NPV has been identified, the output level producing the maximum NPV is identified as the optimum output level 110. The turbine is then commanded by its controller to operate at the optimum output level 112. A query can be made to see if any of the input parameters have changed 114. If not, then the turbine continues to run as is 116. If parameters have changed, then the NPVs are re-calculated and the process repeated to determine the new maximum NPV.

The net present value (NPV) of a turbine is essentially the present value of the revenue that can be generated by the turbine over its remaining lifetime at a particular output level. The fatigue lifetime versus output level is based on the fatigue characteristics of the turbine, which can be provided by the manufacturer of the turbine or otherwise determined.

Figure 4:
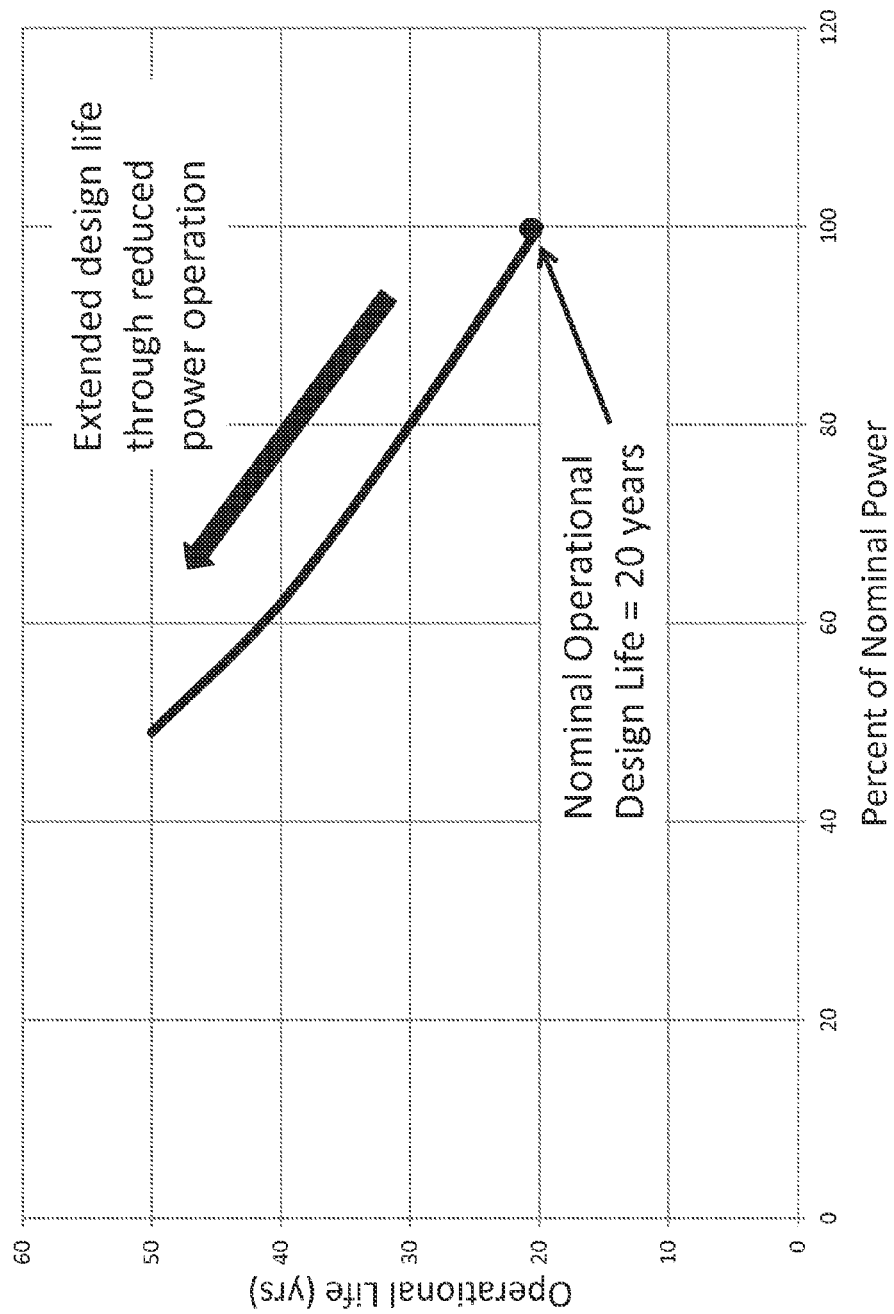
FIG. 4 shows a graph of the operational life of a turbine as related to the output level at which the turbine is operated.

For example, the turbine may have been manufactured to have a 20-year lifetime at a particular maximum output. Therefore, the operating parameters that allow the turbine to run for 20 years would be considered the conventional level, which is referred to as a 100 percent output level. To determine the maximum NPV, various output levels must be selected for comparison. One may choose, for example, to compare output levels from 50 percent to 100 percent at 10 percent increments. Any range and increment can be selected. Having selected the desired range and increment, the lifetime at any given output level must be determined. This can be achieved based on the manufacturer's specification or calculations using known factors. A chart or graph showing an operational life versus power output level may be generated to determine this relationship, as shown in FIG. 4. Selecting output level above 100 percent would decrease the operational lifetime (to less than 20 years in this example), although it would increase the amount of power generated at any given time. Decreasing the output level to 90 percent, 80 percent, 70 percent, 60 percent, etc. of its normal output level increases the lifetime of the turbine (to past 20 years in this example), but also decreases the amount of power generated over any given time. Although the amount of power/revenue generated at any given time at any output level may be easily ascertainable, what is not so easily ascertainable is the NPV of the cumulative total amount of power/revenue generated at a specific output level over the course of the modified lifetime (i.e. the lifetime of the turbine running at output levels other than 100% or normal operating parameters), while taking into consideration market factors affecting the price of the power currently and in the future, which affects the revenue currently and in the future.

Based on the present invention, however, these numbers can be determined and converted to a net present value of the turbine for a particular output level. Once the net present value of each output level is determined for a specified time period, a maximum net present value can be determined for the remaining lifetime of the machine for each selected output level. From the plurality of maximum net present values, the highest maximum net present value can be identified by comparing of the maximum net present values calculated.

Once the highest maximum net present value is determined, the output level associated with the highest maximum net present value can be identified. This is the optimum output level for the particular circumstance. Knowing the optimum output level, the turbine can be commanded to operate at the optimum output level associated with the highest maximum net present value. If any input parameters change so as to change the circumstance, the net present values can be re-calculated to identify a new optimum output level and the turbine can be run at that output level.

Thus, calculating the net present value for each output level, and thereby identifying the maximum NPV, is a key component of the present on. In the preferred embodiment, the net present value for a given output level is determined by the total potential revenue generated by the turbine at a given output level discounted to present value for the remaining lifetime of the turbine at the given output level. For example, annual revenue is the product of the annual energy production times the energy sale price expressed as value per time period, generally dollars per year.

In some embodiments, a discount may be factored in to calculating the potential revenue. The discount rate (DR) is the percent discount utilized by the turbine owner. Generally longer term lower risk situations utilize a low discount rate while shorter term higher risk situations utilize greater discount rate. A long term infrastructure investor might discount at 3-5 percent, a higher risk hedge fund might discount at 15-20 percent. Energy project investors might discount at 6-9 percent.

The maximum potential revenue (Ro) at a given output level may be determined by calculating a potential revenue (Ri) over a period of time (i) and summing the potential revenues (Ri) for each period (i) over the remaining lifetime (No) of the turbine at the given output level.

To take into account the discount, the discount (D) may be the sum of the discount rate (DR) in decimal form added to one, and that sum raised to the i-th power, where i represents the current period of time for which the potential revenue (Ri) is being calculated. The potential revenue (Ri) may be divided by the discount for any given period. The quotient calculated for each period (i) may be accumulated over the remaining lifetime (N) for each respective output level. Thus, an equation that represents the net present value may be:

The sum of [(Ri)/((1+DR)^i)] calculated for the tune period i (e.g. annually) accumulated over the remaining lifetime (N) of the turbine at a given output level.

Equation 1 shows a mathematical expression of the net present value formula.

$$NPV = \sum_{i=1}^{N} \frac{R_i}{(1 + \text{Discount Rate})^i}$$ Equation 1

Other calculations for determining a net present value can also be used.

The potential revenue (Ri) for any given period (i) is determined by multiplying an energy production (EPi) of the turbine for the given period of time (i) by an energy sale rate (ESRi) for the given period (i) at the output level desired. Therefore, Ri=EPi×ESRi.

The energy production can be determined based on historic data or it can be calculated. For historic data, the user can look at the energy production over previous time periods for the same or similar turbine.

An energy production calculation may involve the product of an energy conversion factor (e.g. a net a capacity factor) times the energy capacity of the turbine times the operation time for a given period expressed as units of energy per time period. By way of example only, if the energy resource is measured in megawatts and the time is measured in hours over a period of a year, the energy production may be expressed as megawatt hours of electric power per year (MWhr/yr).

Figure 5:
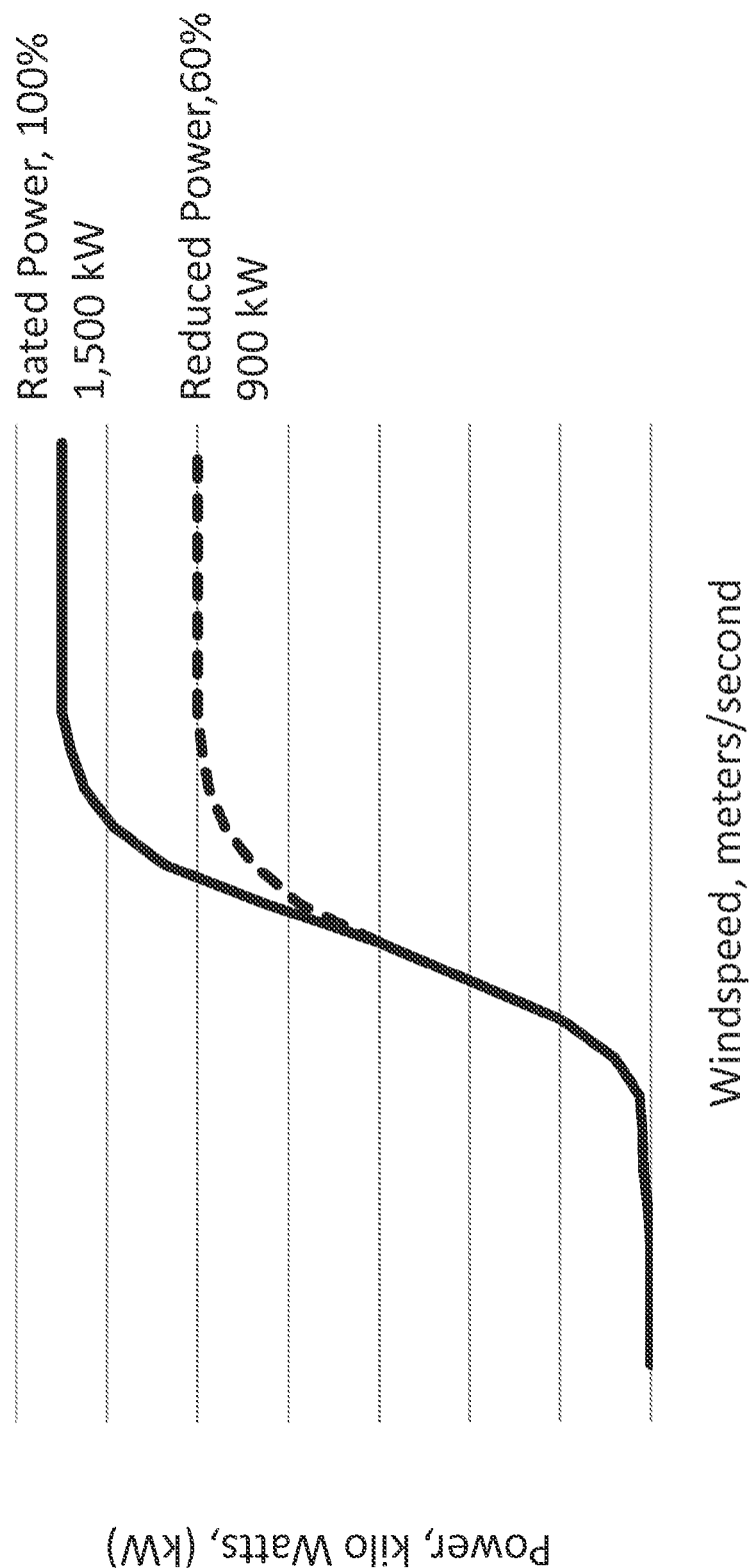
FIG. 5 is a graph of a power curve showing the amount of power a turbine can generate at a given wind speed.

The capacity factor (CF) may be the ratio of the actual or realistic energy producible by a turbine at a particular output level (by converting natural energy, e.g., wind, water, etc., into useful energy, i.e. electric power) to the maximum mum energy producible by the turbine. For instance a wind turbine will produce a certain amount of energy at a given wind speed up to a maximum energy production. Thus, after a certain wind speed, the turbine may not generate any more power due to the configuration or limitations of the turbine. A graph of these functions is referred to as the power curve and can be generated based on the manufacturer's specification. A sample power curve showing the relationship of various wind speeds to the power output of a turbine at those speeds is shown in FIG. 5.

If there was sufficient natural energy (e.g. wind flow) to drive the wind turbine constantly at a rate that would cause the turbine to generate its maximum power, then the maximum energy producible by the turbine in a given year would be the maximum energy production times the amount of time (e.g. hours) in a given time period (e.g. year).

Figure 6:
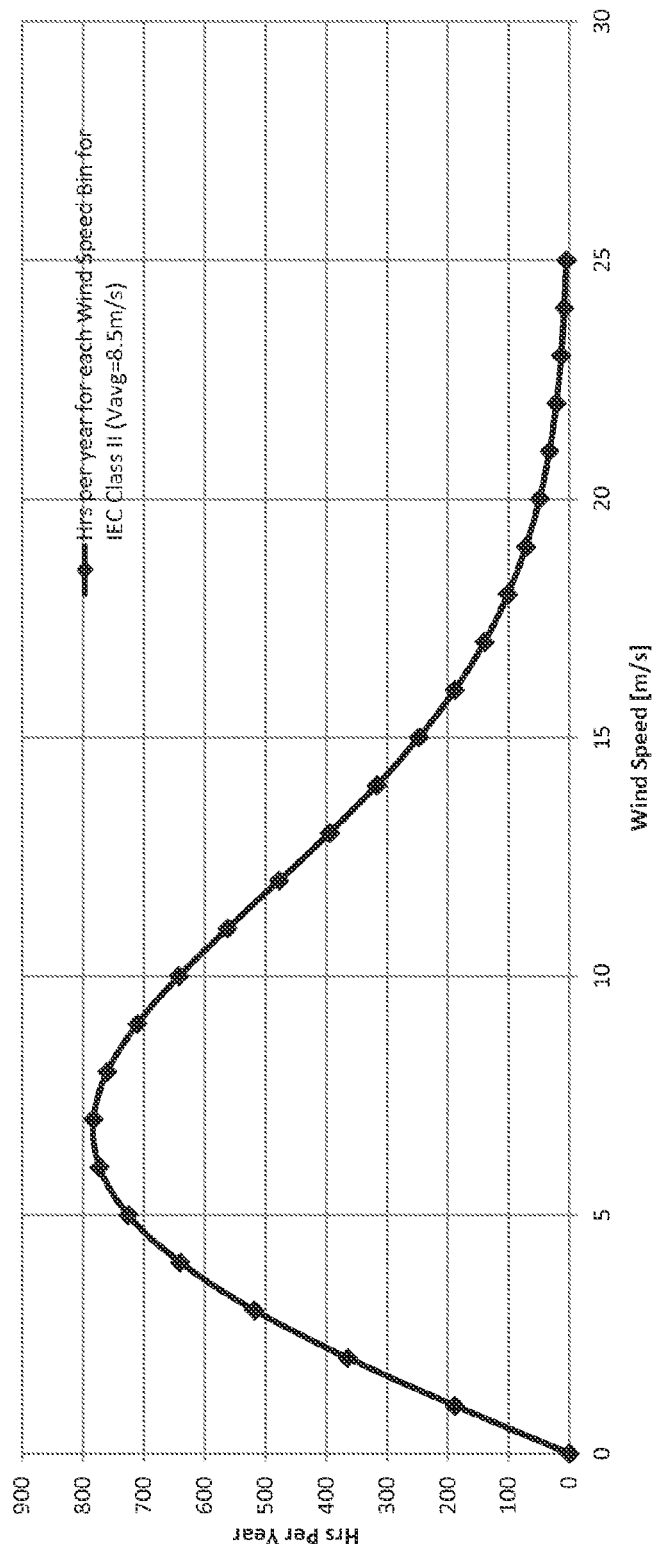
FIG. 6 is a graph of the amount in a given year the wind spends blowing at a specific wind speed.

However, a natural energy resource may not be constantly available at the same amount at all times throughout the year. For example, in a given year, the wind may blow at different speeds for different total times as shown in FIG. 6. In this example, the wind spends most of its time blowing at speeds of approximately 5 meters per second to 9 meters per second. Therefore, the actual energy producible by the turbine operating at a given output level would be the sum of the product of the total time at a given wind speed times the power generated at the wind speed for the given output level for each wind speed. Surprisingly, the amount of wind energy over a course of a year is relatively constant, fluctuating only by about plus or minus 10% per year.

Dividing the actual or predicted energy producible by the turbine, referred to as the realistic energy production, EPr, by the maximum energy producible by the turbine, EPmax, would give a theoretical capacity factor. However, aside from the fact the wind is not blowing at all times at speeds that would cause the turbine to generate maximum power, there are other factors that result in the turbine not running at its optimal performance. These factors are referred to as inefficiency factors (IF). These are assumed reductions in the efficiency of the turbine due to such things as downtime, maintenance, contamination on the blades that slow down the blades, and other such factors that prevent the blades from running at optimal performance. In general, the inefficiency factors (IF) cause the turbine to run at 75 percent to 99 percent of its optimal performance. More realistically, IF cause the turbine to run at 80 percent to 95 percent of its optimal performance. Even more realistically, IF cause the turbine to run at 85 percent to 90 percent of its optimal performance. Therefore, taking into account the general inefficiencies of the turbine results in the net capacity factor (NCF).

This can be repeated for the turbine at each output level desired based on a power curve for that output level. Therefore, the capacity factor (CF) is calculated as the result of dividing the actual or predicted energy production EPr at a given output level by the maximum possible energy production EPmax for a given time period. And, the net capacity factor for a given output level further takes into consideration the inefficiency factors; and therefore, may be represented as NCF=(EPr/EPmax)×IF. Therefore, the NCF is determined by the power curve and the availability of the natural energy resource.

The potential energy production (EP) for a given period (e.g. annually) at a given output level is calculated by multiplying a time (T) for the period (e.g. number of hours in a year) by the energy resource or energy generating capacity (C) of the turbine by a net capacity factor (NCFo) for the given output level. Therefore, EP=T×C×NCFo.

The EP is therefore a function of, among others, the maximum output level of the machine which is a factor driving the NCF. When the machine is commanded to limit its maximum output to lesser levels the NCF and resulting EP will be reduced and its lifetime extended, conversely if the maximum output is commanded to be at greater levels the NCF and the resulting EP will be greater and its lifetime will be shorter.

The energy sale rate ESR for a given period may be determined by a fact (such as a rate determined by a contract), or a prediction (such as that based on estimations or forecasting). Therefore, the energy sale rate can be determined through negotiations between two parties, or by market factors, or some other criteria. Thus, the energy sale rate may be the same for each period of time (e.g. from year to year) or may increase incrementally, may decrease incrementally, or may fluctuate during the contractual period as determined by the contractual agreement.

If the period in question for determining the potential revenue for a given year (Ri) is past the contractual period, then the energy sale rate for that period (ESRi) may be estimated in several ways, for instance, by purchasing an energy rate forecast from a service provider, or calculated by taking the sum of the energy sale rate from an immediate prior year ($ESR_{i-1}$) plus the product of the energy sale rate from the immediate prior year ($ESR_{i-1}$) and an assumed escalation rate (ER). Therefore, $ESRi = ESR_{i-1} + (ESR_{i-1} \times ER)$.

The escalation rate (ER) may be determined by actual facts or by assumptions of the machine's owner. Energy rate facts would be for instance an existing power sale contract with set values for set time periods currently or in the future. Where a time period does not have a power sale rate fact an assumption appropriate to the machine owner would be used. For instance a machine's situation might be with a fixed price power sale contract which will be in place for a predetermined number of years then the price would be based on the market rate, which could be estimated as the contract rate plus an annual escalation.

The lifetime of a turbine at a specific output level can be determined by manufacturer specifications based on the turbine's load versus fatigue life. Alternatively, the lifetime can be constructed as a chart of values for the maximum output versus the fatigue life. The fatigue life is determined by the life limiting components in the order of limitation. In generating machines it is generally gears, shafts, or bearings. These may be steel components made from specific alloys of steel and fabricated in specific shapes and sizes. The fatigue characteristics or properties of steel components, in terms of the load or stress versus the number of load or stress cycles, is well understood and documented in engineering reference documents. This is often referred to as the S-N curve which shows the number of cycles a material can endure at a certain stress level before experiencing fatigue failure. Utilizing the S-N characteristics or properties of the life limiting component(s), for instance the gears, a table or graph of maximum load (Stress) versus the fatigue life (Number of cycles) can be developed to determine the modified lifetime for a given output level.

To further maximize the economic NPV of the turbine, the plurality of net present values of the turbine over the plurality of output levels may be re-calculated to determine a new maximum net present value when any input parameter (e.g. any value used to calculate the plurality of net present values) changes. Then the output level of the turbine can be adjusted to correspond to the maximum net present value.

The process can be implemented in any typical turbine, such as a wind turbine, water turbine, and the like. In fact, any machine used to generate power can utilize this process. Thus, a controller 712 can be configured to execute the process described herein to determine the optimum output level resulting in the maximum net present value and transmit the instructions or command the turbine to adjust the turbine to operate at the optimum output level.

Figure 7:
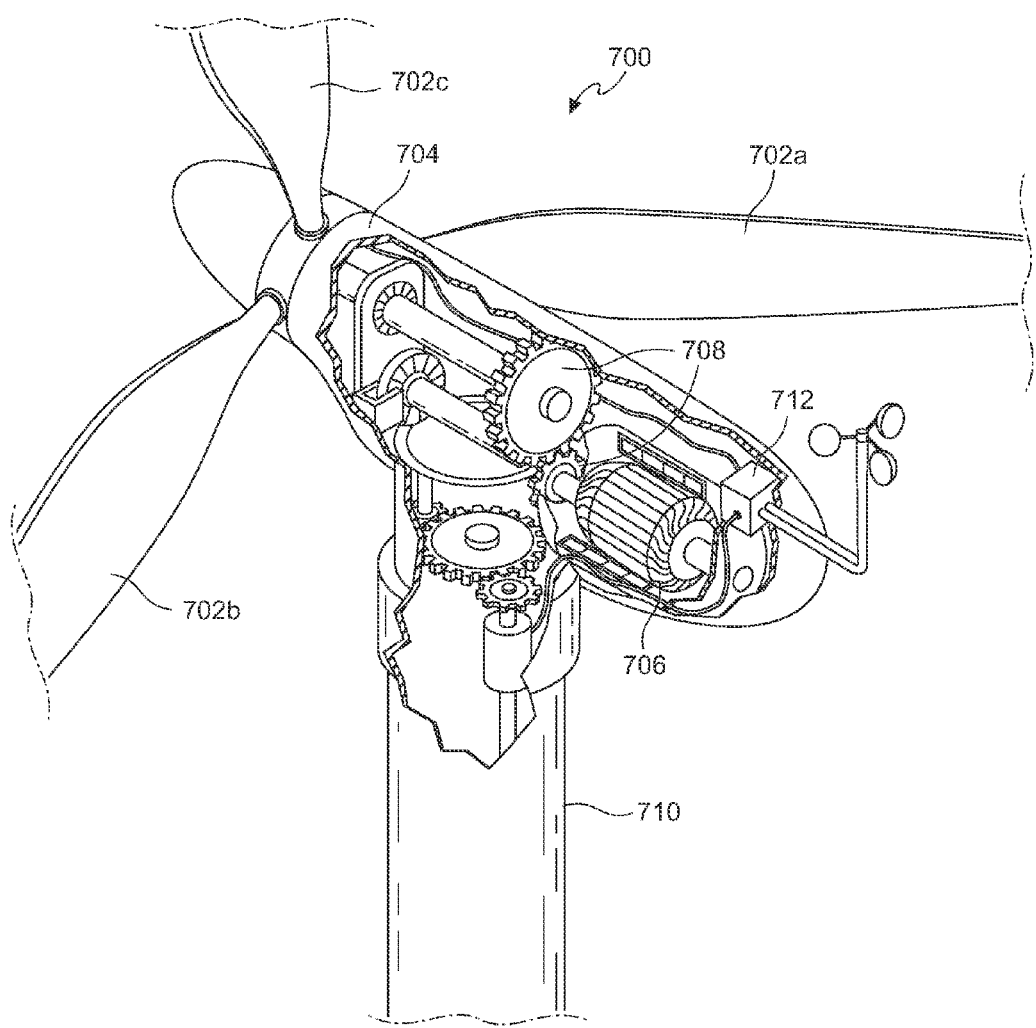
FIG. 7 is an embodiment of wind turbine incorporating the present invention.

As shown in FIG. 7, typical turbines 700 comprise a plurality of blades 702a, 702b, 702c attached to a hub 704, which connects to a shaft, a speed modifying gearbox and then to a generator 706. Rotation of the blades 702a, 702b, 702c by natural energy, such as wind or water, causes rotation of the generator 706 directly or via gears 708 in a gearbox. In the gearbox configuration, the gearbox is connected to the generator 706 to generate the electricity. The blades 702a, 702b, 702c may be connected to a hub in a manner that allows the blades to turn or pitch so that the angle of the blades 702a, 702b, 702c relative to the direction of the natural energy source can be changed. So, the blades 702a, 702b, 702c can be angled so that the surface of the blade is parallel to the direction of the natural energy source (i.e. edges of the blades are turned into the direction of the natural energy source) to minimize the output level of the turbine. The blades 702a, 702b, 702c may also be turned 90 degrees so that the surface of the blades are perpendicular to the direction of the natural energy source. In addition, the blades 702a, 702b, 702c can be turned at any angle in between. Other known methods can be used to alter the output level of the turbine.

Wind turbines 700 further comprise a tower 710 to elevate the blades 702a, 702b, 702c sufficiently to allow the blades 702a, 702b, 702c to rotate without touching the ground. A controller 712 may be operatively connected to the turbine 700 to adjust the blades or some other aspect of the turbine so as to run at the output level designated. The controller 712 may be programmed to carry out the processes described herein. Once the calculations have been made, the controller 712 can send instructions either through a wired connection or wirelessly to command the turbine to run at the designated output level.

A high-level block diagram of an exemplary controller or computing device 800 that may be used to implement systems, apparatus, and methods described herein is illustrated in FIG. 8. The computer 800 comprises a processor 810 operatively coupled to a data storage device and memory. Processor 810 controls the overall operation of computer 800 by executing computer program instructions that define such operations. The computer program instructions may be stored in data storage device 820, or other non-transitory computer readable medium, and loaded into memory 830 when execution of the computer program instructions is desired. Thus, the method steps of FIG. 3 can be defined by the computer program instructions stored in memory 830 and/or data storage device 820 and controlled by processor 810 executing the computer program instructions.

For example, the computer program instructions can be implemented as computer executable code programmed to perform an algorithm defined by the method steps in FIG. 3 and equation 1. Computer 800 may also include one or more network interfaces 840 for communicating with other devices and data sources via a network. Computer 800 may also include one or more input/output devices 850 that enable user interaction with computer 800 (e.g., display, keyboard, touchpad, mouse, speakers, buttons, etc.).

Data storage device 820 and memory 830 each comprise a tangible non-transitory computer readable storage medium. By way of example, and not limitation, such non-transitory computer-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computer-executable instructions, data structures, or processor chip design.

Network/communication interface 840 enables the computer 800 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Token Ring, Wi-Fi (e.g., IEEE 802.11), Wi-MAX (e.g., 802.16), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 840 enables the computer 800 to transfer data, synchronize information, update software, or any other suitable operation.

Any or all of the systems and apparatus discussed herein, including personal computers, tablet computers, hand-held devices, cellular telephones, servers, database, cloud-computing environments, and components thereof, may be implemented using a computer such as computer 800. Therefore, the output level of the turbine can be controlled at the turbine or remotely with any of these devices implementing the process described herein. Applications can be created to allow a user enter new input parameters at the turbine or remotely to adjust the output level. In some embodiments, the computer can monitor input parameters than may change and automatically make adjustments to the output level according to the process described herein as these parameters change.

EXAMPLE

The following is a sample of how to implement the present invention. The following known facts can be readily ascertained: the machine is a 1.5 megawatt wind turbine designed to run for 20 years with a maximum power limitation of 100 percent output level, the owner's discount rate is 8 percent, the current energy sale rate is 50 dollars per megawatt hour fixed for the next 10 years, and the energy sale rate after that 10 year period will be 50 dollars per MWhr escalated at 2 percent per year.

TABLE 1

| Energy resource capacity (C) | Discount Rate (DR) | Energy Sale Rate (ESR) | Escalation Rate (ER) |
| --- | --- | --- | --- |
| 1.5 MW | 8 percent | 50 dollars per MWhr | 2 percent annually after first 10 years |

For this example, the output levels being compared are 50 percent ($O_{50}$), 60 percent ($O_{60}$), 80 percent ($O_{80}$), and 100 percent ($O_{100}$). The normal lifetime of the turbine and the modified lifetime of the turbine operating at an output level other than 100 percent is shown in FIG. 4. The net capacity factor (NCF) is determined based on a power curve, such as that shown in FIG. 5, and the wind speed curve shown in FIG. 6. Table 2 shows an example of the total energy produced for a turbine running at a 100 percent output level ($O_{100}$) in a given year based on the varying windspeed.

TABLE 2

| wind speed (m/s) | hours per year for each wind speed bin (hrs) | power curve of turbine based on manufacturer's specification (KW) | Energy generated (KW-hrs) |
| --- | --- | --- | --- |
| 0 | 0.0 | 0 | 0 |
| 1 | 188.4 | 0 | 0 |
| 2 | 364.7 | 0 | 0 |
| 3 | 518.1 | 0 | 0 |
| 4 | 640.2 | 43 | 27,528 |
| 5 | 725.7 | 131 | 95,061 |
| 6 | 772.6 | 250 | 193,161 |
| 7 | 782.6 | 416 | 325,572 |
| 8 | 759.9 | 640 | 486,307 |
| 9 | 710.6 | 924 | 656,595 |
| 10 | 642.2 | 1181 | 758,461 |
| 11 | 562.3 | 1359 | 764,107 |
| 12 | 477.7 | 1436 | 685,953 |
| 13 | 394.3 | 1481 | 584,025 |
| 14 | 316.7 | 1494 | 473,090 |
| 15 | 247.5 | 1500 | 371,311 |
| 16 | 188.5 | 1500 | 282,758 |
| 17 | 139.9 | 1500 | 209,870 |
| 18 | 101.3 | 1500 | 151,893 |
| 19 | 71.5 | 1500 | 107,236 |
| 20 | 49.2 | 1500 | 73,875 |
| 71 | 33.1 | 1500 | 49,673 |
| 22 | 21.7 | 1500 | 32,608 |
| 23 | 13.9 | 1500 | 20,902 |
| 24 | 8.7 | 1500 | 13,085 |
| 25 | 5.3 | 1500 | 8,002 |
| Total | | | 6,371,073 |

If this turbine could run at 100 percent output level at its maximum power (1500 KW) for one full year (8760 hours), the maximum energy produced (EPmax) would be 13,140,000 KW-hrs. However, in a given year, the wind does not blow constantly at a rate that would maximize the power output of the turbine. Rather, in a given year, the wind spent most of its time blowing between 5 and 9 meters per second. Thus, of the 8760 hours in a year, the wind blew at 1 meter per second for a total of 188.4 hours, at 2 meters per second for a total of 364.7 hours, at 3 meters per second for 518.1 hours, and so on. Based on the power curve shown in FIG. 5, when the wind blows at 1 meter per second to 3 meters per second, no power is generated. Only when the wind blows at 4 meters per second does the turbine begin to generate power. In this case at wind speeds of 4 meters per second, the turbine is able to generate 43 KW of power. Since the wind spent 640.2 hours at 4 meters per second, approximately 27,528 KW-hrs of energy was produced from 640.2 hours of work. As shown in Table 2, the amount of energy generated at each wind speed can be calculated based on the number of hours the wind spends at that wind speed. Adding up all of the actual or predicted energy generated for all wind speeds and their respective times results in approximately 6,371,073 KW-hrs of real energy produced (EPr). Therefore, the theoretical capacity factor at 100 percent output level is EPr/EPmax, which is 48 percent. In this example, the inefficiency factor was assumed to be 85 percent. Therefore, the net capacity factor was 41 percent.

This process can be repeated for each of the output levels being compared. Table 3 shows an example of the results of the power curve when the turbine is run at 60 percent output level ($O_{60}$).

TABLE 3

| wind speed (m/s) | hours per year for each wind speed bin (hrs) | power curve of turbine based on manufacturer's specification (KW) | Energy generated (KW-hrs) |
|---|---|---|---|
| 0 | 0.0 | 0 | — |
| 1 | 188.4 | 0 | — |
| 2 | 364.7 | 0 | — |
| 3 | 518.1 | 0 | — |
| 4 | 640.2 | 43 | 27,528 |
| 5 | 725.7 | 131 | 95,061 |
| 6 | 772.6 | 250 | 193,161 |
| 7 | 782.6 | 416 | 325,572 |
| 8 | 759.9 | 640 | 486,307 |
| 9 | 710.6 | 900 | 639,541 |
| 10 | 642.2 | 900 | 577,998 |
| 11 | 562.3 | 900 | 506,031 |
| 12 | 477.7 | 900 | 429,915 |
| 13 | 394.3 | 900 | 354,910 |
| 14 | 316.7 | 900 | 284,994 |
| 15 | 247.5 | 900 | 222,787 |
| 16 | 188.5 | 900 | 169,655 |
| 17 | 139.9 | 900 | 125,922 |
| 18 | 101.3 | 900 | 91,136 |
| 19 | 71.5 | 900 | 64,342 |
| 20 | 49.2 | 900 | 44,325 |
| 21 | 33.1 | 900 | 29,804 |
| 22 | 21.7 | 900 | 19,565 |
| 23 | 13.9 | 900 | 12,541 |
| 24 | 8.7 | 900 | 7,851 |
| 75 | 5.3 | 900 | 4,801 |
| Total | | | 4,713,746 |

As indicated above, the maximum power that can be generated by the turbine is 1500 KW. Therefore, if this turbine could constantly run at windspeeds that could generate 1500 KW of power, then over the course of one year, the maximum energy production (EPmax) would be 13,140,000 KW-hrs.

The realistic energy production (EPr), however, can be calculated based on Table 3 by multiplying the number of hours spent at a given windspeed times the power generated for that windspeed at a 60 percent output level, and summing the energy produced at all windspeeds. Based on Table 3, the EPr at 60 percent output level is approximately 4,713,746 KW-hrs. Therefore, the theoretical capacity factor at 60 percent output level is 36 percent. Taking into consideration the inefficiency factor of 85 percent, the net capacity factor at a 60 percent output level is 30 percent. This process can be repeated for all the output levels to be considered. Table 4 shows the net capacity factors at various output levels.

The annual energy production is determined by multiplying the number of hours in a year (8760 hours) times the capacity of the turbine (1.5 MW according to manufacturer's specification) times the NCF for a given output level. The EP is calculated for each output level. The existing life already used is 10 years. Therefore, the remaining life is simply the lifetime total fatigue life for the given output level minus the existing life already used. These values are reproduced in Table 4. In this example, the conventional lifetime was 20 years. Based on the power curve shown in FIG. 4, the remaining lifetime can be determined.

TABLE 4

| Output Level, (percent of normal) | Remaining Life (years) | Net Capacity Factor (NCF) | Energy Production, EPi (MWhr/year) |
|---|---|---|---|
| 50 | 40 | 27 | 3548 |
| 60 | 30 | 30 | 3942 |

TABLE 4-continued

| Output Level, (percent of normal) | Remaining Life (years) | Net Capacity Factor (NCF) | Energy Production, EPi (MWhr/year) |
|---|---|---|---|
| 80 | 20 | 37 | 4862 |
| 100 | 10 | 41 | 5387 |

So, the annual potential revenue (Ri) at any given output level (50 percent, 60 percent, 80 percent, etc.) for a given year (i) can be calculated by multiplying the EPi by the energy sale rate (ESRi) for the given year (i). Table 5 shows a sample of the revenue for a 50 percent output level.

TABLE 5

| Year, i | Energy production, EPi (MWhr/year) | Energy Sale Rate, ESRi | Revenue, Ri (dollars/yr) |
|---|---|---|---|
| 1 | 3548 | 50 | 177,400 |
| 2 | 3548 | 50 | 177,400 |
| 3 | 3548 | 50 | 177,400 |
| 4 | 3548 | 50 | 177,400 |
| 5 | 3548 | 50 | 177,400 |
| 6 | 3548 | 50 | 177,400 |
| 7 | 3548 | 50 | 177,400 |
| 8 | 3548 | 50 | 177,400 |
| 9 | 3548 | 50 | 177,400 |
| 10 | 3548 | 50 | 177,400 |
| 11 | 3548 | 51 | 180,948 |
| 12 | 3548 | 52 | 184,496 |
| 13 | 3548 | 53 | 188,044 |
| 14 | 3548 | 54 | 191,592 |
| 15 | 3548 | 55 | 195,140 |
| 16 | 3548 | 56 | 198,688 |
| 17 | 3548 | 57 | 202,236 |
| 18 | 3548 | 59 | 209,332 |
| 19 | 3548 | 60 | 212,880 |
| 20 | 3548 | 61 | 216,428 |
| 21 | 3548 | 62 | 219,976 |
| 22 | 3548 | 63 | 223,524 |
| 23 | 3548 | 65 | 230,620 |
| 24 | 3548 | 66 | 234,168 |
| 25 | 3548 | 67 | 237,716 |
| 26 | 3548 | 69 | 244,812 |
| 27 | 3548 | 70 | 248,360 |
| 28 | 3548 | 71 | 251,908 |
| 29 | 3548 | 73 | 259,004 |
| 30 | 3548 | 74 | 262,552 |
| 31 | 3548 | 76 | 269,648 |
| 32 | 3548 | 77 | 273,196 |
| 33 | 3548 | 79 | 280,292 |
| 34 | 3548 | 80 | 283,840 |
| 35 | 3548 | 82 | 290,936 |
| 36 | 3548 | 84 | 298,032 |
| 37 | 3548 | 85 | 301,580 |
| 38 | 3548 | 87 | 308,676 |
| 39 | 3548 | 89 | 315,772 |
| 40 | 3548 | 91 | 322,868 |

In this example, the energy sale rate was fixed for 20 years. Since only 10 years has elapsed, for the next 10 years the ESR remains fixed at 50 dollars per megawatt-hour; therefore, the annual revenue for any given output level is constant for the next 10 years. After 10 years, the example potential revenue for the given output levels increases as shown based on a 2 percent escalation rate. However, once the fatigue life is reached, there is no further potential revenue. Tables 6-8 show the potential annual revenue (Ri) for output levels at 60 percent, 80 percent, and 100 percent, respectively.

TABLE 6

| Year, i | Energy production, EPi (MW-hr/year) | Energy Sale Rate, ESRi | Revenue, Ri (dollars/yr) |
| --- | --- | --- | --- |
| 1 | 3942 | 50 | 131,400 |
| 2 | 3942 | 50 | 131,400 |
| 3 | 3942 | 50 | 131,400 |
| 4 | 3942 | 50 | 131,400 |
| 5 | 3942 | 50 | 131,400 |
| 6 | 3942 | 50 | 131,400 |
| 7 | 3942 | 50 | 131,400 |
| 8 | 3942 | 50 | 131,400 |
| 9 | 3942 | 50 | 131,400 |
| 10 | 3942 | 50 | 131,400 |
| 11 | 3942 | 51 | 134,028 |
| 12 | 3942 | 52 | 136,656 |
| 13 | 3942 | 53 | 139,284 |
| 14 | 3942 | 54 | 141,912 |
| 15 | 3942 | 55 | 144,540 |
| 16 | 3942 | 56 | 147,168 |
| 17 | 3942 | 57 | 149,796 |
| 18 | 3942 | 59 | 155,052 |
| 19 | 3942 | 60 | 157,680 |
| 20 | 3942 | 61 | 160,308 |
| 21 | 3942 | 62 | 162,936 |
| 22 | 3942 | 63 | 165,564 |
| 23 | 3942 | 65 | 170,820 |
| 24 | 3942 | 66 | 173,448 |
| 25 | 3942 | 67 | 176,076 |
| 26 | 3942 | 69 | 181,332 |
| 27 | 3942 | 70 | 183,960 |
| 28 | 3942 | 71 | 186,588 |
| 29 | 3942 | 73 | 191,844 |
| 30 | 3942 | 74 | 194,472 |

TABLE 7

| Year, i | Energy production, EPi (MWhr/year) | Energy Sale Rate, ESRi | Revenue, Ri (dollars/yr) |
| --- | --- | --- | --- |
| 1 | 4862 | 50 | 243,100 |
| 2 | 4862 | 50 | 243,100 |
| 3 | 4862 | 50 | 243,100 |
| 4 | 4862 | 50 | 243,100 |
| 5 | 4862 | 50 | 243,100 |
| 6 | 4862 | 50 | 243,100 |
| 7 | 4862 | 50 | 243,100 |
| 8 | 4862 | 50 | 243,100 |
| 9 | 4862 | 50 | 243,100 |
| 10 | 4862 | 50 | 243,100 |
| 11 | 4862 | 51 | 247,962 |
| 12 | 4862 | 52 | 252,824 |
| 13 | 4862 | 53 | 257,686 |
| 14 | 4862 | 54 | 262,548 |
| 15 | 4862 | 55 | 267,410 |
| 16 | 4862 | 56 | 272,272 |
| 17 | 4862 | 57 | 277,134 |
| 18 | 4862 | 59 | 286,858 |
| 19 | 4862 | 60 | 291,720 |
| 20 | 4862 | 61 | 296,582 |

TABLE 8

| Year, i | Energy production, EN (MWhr/year) | Energy Sale Rate, ESRi | Revenue, Ri (dollars/yr) |
| --- | --- | --- | --- |
| 1 | 5387 | 50 | 269,350 |
| 2 | 5387 | 50 | 269,350 |
| 3 | 5387 | 50 | 269,350 |
| 4 | 5387 | 50 | 269,350 |
| 5 | 5387 | 50 | 269,350 |
| 6 | 5387 | 50 | 269,350 |
| 7 | 5387 | 50 | 269,350 |
| 8 | 5387 | 50 | 269,350 |
| 9 | 5387 | 50 | 269,350 |
| 10 | 5387 | 50 | 269,350 |

To calculate the net present value (NPV), the potential revenue Ri for each year is summed over the fatigue lifetime of the turbine at a given output level. So, at 50 percent output level, the potential revenue generated at each year up to 40 years is summed. At 60 percent output level, the potential revenue generated at each year is summed for 30 years, at 80 percent output level the potential revenue is summed for 20 years, and so on. The output level corresponding to the highest total potential revenue is the optimum output level and the turbine can be commanded to run at that output level.

However, to take into consideration the discount rate, the potential revenue for a given year at a given output level is divided by the discount, wherein the discount is the sum of one plus the discount rate, with the sum raised to the power of the given year. So, the discounted revenue for the first year for a given output level is the potential revenue $R_1$ generated at the first year at the given output level divided by 1.08, since the discount rate is 8 percent. For the second year, the revenue for the second year $R_2$ is divided by 1.08 raised to the second power, or 1.166. For the third year, the revenue for the third year $R_3$ is divided by 1.08 raised to the third power, or 1.260, and so on.

This calculation is repeated for the next year, and each subsequent year until the fatigue lifetime N for the given output level has been reached. Then the discounted revenue is summed for each year to determine maximum net present value for the given output level. This is repeated for each output level. Using the present example, the maximum net present values, taking into consideration the discount rate, for each output level selected is shown in Table 9.

TABLE 9

| Output Level (Percent normal) | Maximum Net Present Value (Dollars) |
| --- | --- |
| 50 | 2,334,835 |
| 60 | 2,378,688 |
| 80 | 2,463,791 |
| 100 | 1,807,360 |

The output level corresponding to the highest of the maximum net present values is the optimum output level, and the turbine can be commanded to run at that output level. In this example, running the turbine at 80% output level generated the highest maximum net present value at $2,463,791. Therefore, this turbine under the current circumstances will be commanded to operate at 80% output level.

If and when any of the input parameters change, the system can determine the input values again, recalculate the NPVs, select the Maximum NPV and its associated Maximum Output level, then command the machine's control system to operate at that value.

With this process, the net present value of any output level can be compared to the net present value at 100% to determine which output level produces the best overall efficiency.

In addition, a series of output levels from 1% to 100% increasing at any increments (e.g. 1 percent, 2 percent, 5 percent, 10 percent, etc.) can be compared. Decreasing the increment will give more accurate results.

The foregoing description of the preferred embodiment of the invention has been presented for the purposes of illustration and description. It, is not intended to be exhaustive or to limit the invention, to the precise form disclosed. Many modifications and variations are possible in light of the above teaching. It is intended that the scope of the invention, not be limited by this detailed description, but by the claims and the equivalents to the claims appended hereto.

What is claimed is:

1. A turbine, comprising:
    a. a plurality of blades to capture natural energy;
    b. a hub attached to the plurality of blades, the hub connected to a generator to convert the natural energy captured by the plurality of blades into electrical energy; and
    c. a controller operatively connected to a processor that iteratively calculates a plurality of net present values of the turbine for a plurality of output levels, and for each iteration, determines a maximum net present value from the plurality of calculated net present values, identifies an output level associated with the maximum net present value, and commands the controller to operate the turbine at the output level associated with the maximum net present value, wherein each net present value for its respective output level is determined by a sum of a function over a period from 1 to N, wherein the function is calculated by a revenue ($R_i$) generated by the turbine at a given time period (i), and wherein N is the lifetime of the turbine, wherein $R_i$ is determined by multiplying an energy production (EP) for the given time period (i) of the turbine by an energy sale rate at the given time period (i), wherein the energy production (EP) is calculated by multiplying a time for the given period by an energy generating capacity of the turbine and by a capacity factor.

2. The turbine of claim 1, wherein the revenue ($R_i$) is a discounted revenue, wherein the discounted revenue is the revenue ($R_i$) divided by a discount rate plus 1 raised to the i-th power.

3. The turbine of claim 1, wherein the capacity factor is a net capacity factor multiplied by an inefficiency factor.

4. A controller for operating a turbine to maximize an economic present value of the turbine by extending a lifetime of the turbine, wherein the controller is configured to:
    a. calculate a plurality of net present values of the turbine for a plurality of output levels;
    b. determine a maximum net present value from the plurality of calculated net present values;
    c. identify an optimum output level corresponding with the maximum net present value; and
    d. operate the turbine at the optimum output level, whereby the economic present value is maximized, and the lifetime of the turbine is extended,
    e. wherein each net present value for its respective output level is determined by a total potential revenue of the turbine at its respective output level for its respective lifetime,
    f. wherein the total potential revenue is determined by calculating a potential revenue ($R_i$) at a given output level over a period of time (i) divided by a discount rate plus 1 raised to the i-th power, accumulated over the lifetime (N) at the respective output level,
    g. wherein $R_i$ is determined by multiplying an energy production for the period of time of the turbine by an energy sale rate for the given period of time (i),
    h. wherein the energy production is calculated by multiplying a time for the period by an energy generating capacity of the turbine and by a net capacity factor,
    i. wherein the energy sale rate for a given year is determined by a contract, and
    j. wherein the energy sale rate for a given year after an expiration of the contract is calculated by taking a sum of an energy sale rate from an immediate prior year plus a product of the energy sale rate from the immediate prior year and an escalation rate, and
    k. wherein the net capacity factor is determined by a power curve and an availability of a natural energy resource.

5. The controller of claim 4, wherein the plurality of net present values of the turbine over the plurality of output levels is re-calculated to determine a new maximum net present value when any value for calculating the plurality of net present values changes, and wherein the output level of the turbine is adjusted to correspond to the new maximum net present value.

6. A controller for operating a turbine to maximize an economic present value of the turbine over a lifetime (N) of the turbine, wherein the controller is configured to:
    a. calculate a plurality of net present values of the turbine for a plurality of output levels;
    b. determine a maximum net present value from the plurality of calculated net present values;
    c. identify an output level associated with the maximum net present value; and
    d. operate the turbine at the output level associated with the maximum net present value,
    e. re-calculate the plurality of net present values of the turbine over the plurality of output levels to determine a new maximum net present value when any input parameter for calculating the plurality of net present values changes,
    f. adjust the output level of the turbine to correspond to the new maximum net present value, whereby the economic present value of the turbine is maximized, wherein each net present value for its respective output level is determined by a sum of a function over a period from 1 to N, wherein the function is calculated by a revenue ($R_i$) generated by the turbine at a given time period (i), wherein $R_i$ is determined by multiplying an energy production (EP) for the given time period (i) of the turbine by an energy sale rate at the given time period (i), wherein the energy production (EP) is calculated by multiplying a time for the given period by an energy generating capacity of the turbine and by a capacity factor.

7. The controller of claim 6, wherein the revenue ($R_i$) is a discounted revenue, wherein the discounted revenue is the revenue ($R_i$) divided by a discount rate plus 1 raised to the i-th power.

8. The controller of claim 6, wherein the capacity factor is a net capacity factor that takes into consideration an inefficiency factor.

9. The controller of claim 8, wherein the net capacity factor is the capacity factor multiplied by the inefficiency factor.

10. The controller of claim 6, wherein the energy production (EP) is determined by historic data of the turbine.

11. The controller of claim 6, wherein the energy sale rate for the given time period is determined by a method selected from the group consisting of a fact and a prediction.

12. The controller of claim 11, wherein the energy sale rate for the given year is determined by a contract, and after an expiration of the contract the energy sale rate is calculated by multiplying the energy sale rate from an immediate prior year, with an escalation rate plus 1.

13. The controller of claim 6, wherein the energy sale rate for the given time period is determined by a forecast.

\* \* \* \* \*